No. 739,117. Patented September 15, 1903.

UNITED STATES PATENT OFFICE.

OTTO SOHST, OF HÖCHST-ON-THE-MAIN, GERMANY, ASSIGNOR TO FARBWERKE, VORM. MEISTER, LUCIUS & BRÜNING, OF HÖCHST-ON-THE-MAIN, GERMANY, A CORPORATION OF GERMANY.

YELLOW ACRIDINIUM DYE AND PROCESS OF MAKING SAME.

SPECIFICATION forming part of Letters Patent No. 739,117, dated September 15, 1903.

Application filed August 7, 1902. Serial No. 118,802. (Specimens.)

*To all whom it may concern:*

Be it known that I, OTTO SOHST, Ph. D., a citizen of the Empire of Germany, residing at Höchst-on-the-Main, Germany, have invented certain new and useful Yellow Acridinium Dyes and Process of Making the Same, of which the following is a specification.

Dyestuffs of the acridinium series—that is to say, those alkylated at the acridin nitrogen have hitherto only been obtained by the action of an alkyl halide, dimethyl sulfate, or para-toluenesulfonic acid ester on certain amido-acridins—such, for instance, as acridin yellow, benzoflavin, &c. (American patent specifications Nos. 666,095 and 666,096.) By the action of acid and alcohol on amido-acridins, however, alkylated acridin dyestuffs are formed in the amido groups. (English specification No. 8,872 of 1900, lines 40 to 49.) I now have found a process which permits of alkylating simultaneously the acridin nitrogen and the amido groups. (The alkylation of the amido groups occurs in general only partially.) This simultaneous alkylation is effected by heating to a high temperature the diluted aqueous acid solutions of leuco compounds of acridin dyestuffs with alcohol. For the leuco compounds the corresponding methane bases may directly be used; but then the shade of the dyestuff obtained is often somewhat dull. The dyestuffs obtained in this manner have the general formula:

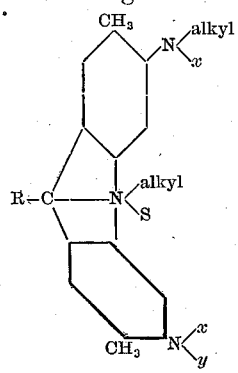

wherein "R" means hydrogen, phenyl, methyl, &c.; "S," an acid radical, and "X" and "Y" hydrogen or "alkyl."

The manufacture of these dyestuffs alkylated at the acridin nitrogen and in the amido groups is easily carried out, as may be seen by the following example: Two hundred and fifty grams of crystallized meta-toluylenediamin are disolved in about five hundred cubic centimeters of water and two hundred and fifty grams of concentrated hydrochloric acid of 20° Baumé. Then seventy-five grams of formaldehyde of forty-per-cent. strength or the equivalent quantity of another aldehyde—for instance, sixty grams of acetaldehyde—of seventy-five-per-cent. strength are slowly added at ordinary temperature and stirred for ten to fifteen hours. The solution thus obtained is then treated in a suitable closed vessel with two hundred and fifty grams of concentrated hydrochloric acid and heated for four hours to 140° centigrade. The mass having cooled to 60° centigrade, one hundred and fifty grams of methyl alcohol are added, and the whole is heated for from one to two hours to 170° centigrade. Thus a clear feeble-yellow-colored solution is obtained, which when exposed to the air intensifies by oxidation. The latter is completed by adding a solution of one hundred and twenty grams of ferric chlorid. It is then filtered, and the dyestuff is precipitated with zinc chlorid and common salt. The dyestuff may further be purified by dissolving ten parts of it in about five hundred parts of hot water. The solution is then made alkaline and is filtered while being hot. The filtrate is again acidified with hydrochloric acid and the dyestuff is reprecipitated with zinc chlorid and common salt. If a larger quantity of methyl alcohol is employed—for instance, three hundred grams instead of one hundred and fifty grams—and, if heated for a longer time, the shade of the dyestuff is of a somewhat redder tint. Generally ethyl alcohol yields a more yellowish dyeing product than methyl alcohol.

When dry and pulverized, the dyestuffs are brown-red powders, readily soluble in water, dyeing cotton treated with tannin and leather yellow to orange-yellow. It is characteristic that from the hot diluted aqueous solutions of their hydrochlorids the free bases are not precipitated by ammonia, but only by caustic-soda lye. The dyestuffs are insoluble in ether and benzene, soluble with difficulty in alcohol. In concentrated sulfuric acid they dissolve to a greenish-yellow coloration, and on addition of water an orange-yellow solution is obtained.

Having now described my invention, what I claim is—

1. The herein-described process for the manufacture of yellow to orange-yellow dyestuffs of the acridinium series being not only alkylated at the acridin nitrogen but also partially in the amido groups, which consists in heating the leuco compounds of amido-acridin dyestuffs in a solution of dilute hydrochloric acid with alcohol to a high temperature and in oxidizing them afterward, substantially as set forth.

2. As a new product a yellow to orange-yellow dyeing dyestuff having the formula:

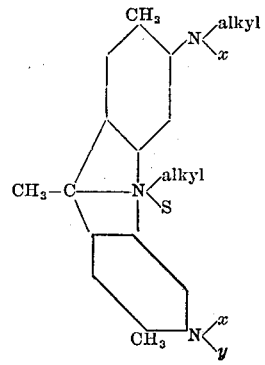

wherein "S" means an acid radical and "X" and "Y" hydrogen or alkyl, being a brown-red powder easily soluble in water to an orange-yellow coloration and having the characteristic fastness of acridinium dyestuffs to sodium carbonate and ammonia; it is soluble with difficulty in alcohol, insoluble in ether and benzene, soluble, however, in concentrated sulfuric acid to a yellow coloration with a green-yellow fluorescence; it dyes cotton treated with tannin and leather yellow to orange-yellow shades.

In testimony that I claim the foregoing as my invention I have signed my name in presence of two subscribing witnesses.

OTTO SOHST.

Witnesses:
ALFRED BRISBOIS,
BERNHARD LEYDECKER.